United States Patent [19]
Ni

[11] Patent Number: 5,865,262
[45] Date of Patent: Feb. 2, 1999

[54] HYDROGEN FUEL SYSTEM FOR A VEHICLE

[76] Inventor: Xuan Z. Ni, 18868 Arata Way, Cupertino, Calif. 95014

[21] Appl. No.: 685,542

[22] Filed: Jul. 24, 1996

[51] Int. Cl.$^6$ ..................................................... B60K 8/00
[52] U.S. Cl. ..................... 180/54.1; 48/117; 123/DIG. 12
[58] Field of Search ................... 180/54.1, 65.2, 180/65.3; 123/3, DIG. 12; 48/116, 117, 118, 199 FM

[56] References Cited

U.S. PATENT DOCUMENTS

| | | | |
|---|---|---|---|
| 4,088,450 | 5/1978 | Kosaka et al. ............................. | 123/3 |
| 4,418,653 | 12/1983 | Yoon ........................................ | 123/3 |
| 4,520,764 | 6/1985 | Ozawa et al. ..................... | 123/DIG. 12 |
| 4,567,857 | 2/1986 | Houseman et al. ............... | 123/DIG. 12 |
| 4,876,989 | 10/1989 | Karpuk et al. .............................. | 123/3 |
| 5,409,784 | 4/1995 | Bromberg et al. ..................... | 180/65.3 |

*Primary Examiner*—J. J. Swann
*Assistant Examiner*—Frank Vanaman

[57] ABSTRACT

A hydrogen fuel system including an engine is mounted on a vehicle and is operable when the engine is running, for generating and storing hydrogen on the vehicle. The system includes a hydrogen gas tank, a chemical reactor with catalyst, a heat exchanger, an alcohol tank and an acetic ether tank. The alcohol from the alcohol tank is vaporized in the heat exchanger, reacts with the catalyst in the chemical reactor and forms hydrogen which passes to the hydrogen gas tank and acetic ether, which is stored in the acetic ether tank.

3 Claims, 1 Drawing Sheet

HYDROGEN FUEL SYSTEM FOR A VEHICLE

FIELD OF THE INVENTION

The field of the invention is a hydrogen fuel system for a vehicle powered by an engine.

DESCRIPTION OF THE PRIOR ART

Various proposals have been made utilizing hydrogen as a fuel.

U.S. Pat. No. 4,085,709 discloses a hydrogen fuel system by using an electrolyzer and D.C. power supply.

U.S. Pat. No. 5,202,195 discloses a way of releasing hydrogen on contact with water in a highly exothermic reaction.

U.S. Pat. No. 5,372,6117 discloses a hydrogen generator for hydrolyzing hydrides.

U.S. Pat. No. 3,836,553 discloses a dehydrogenating of alcohol to aldehyde or ketones, it does not produce hydrogen gas.

U.S. Pat. No. 3,940,446 discloses a dehydrogenating of alcohol to aldehyde or ketones, it does not produce hydrogen gas.

The hydrogen fuel system of the present invention provides hydrogen gas to the engine on the vehicle and does not need frequent replacement of the catalyst for the chemical reactor.

SUMMARY OF THE INVENTION

This invention is directed toward a system including an engine mounted on a vehicle and operates when the engine is running to generate hydrogen that powers the vehicle. The system includes a gas tank, a chemical reactor with a catalyst, a heat exchanger, a tank for storing alcohol and a tank for storing acetic ether. Alcohol from the alcohol storage tank reacts with a catalyst in the heat exchanger to produce acetic ether, which is stored in the acetic ether tank, and hydrogen which is used to power the engine.

DESCRIPTION OF A PREFERRED EMBODIMENT

Figure 1:
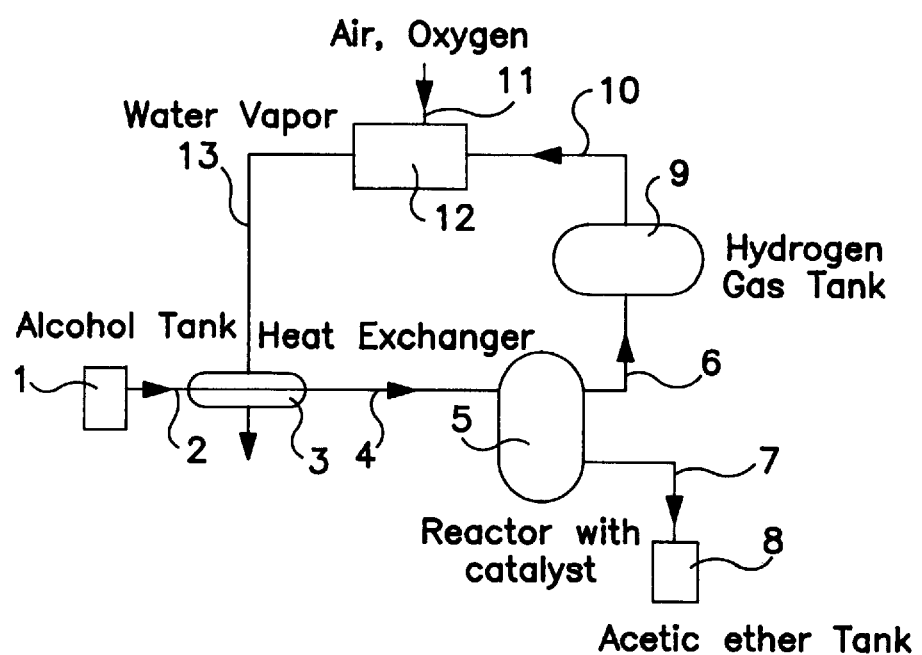
FIG. 1 is a schematic block diagram of one embodiment of the hydrogen fuel system of the present invention.

Referring now to the drawing in detail one embodiment of the hydrogen fuel system of the present invention is schematically illustrated in FIG. 1 and generally identified by reference numeral 5. The system 5 is mounted on a vehicle (not shown) and includes an engine 12, a tank 9 for storing hydrogen gas, a heat exchanger 2, a tank 1 for storing alcohol and a tank 8, for storing acetic ether.

Alcohol flows from tank 1 through conduit 2 to the heat exchanger 3. The vaporized alcohol passes through conduit 4 to reactor 5 containing the catalyst and is converted to acetic ether and hydrogen. The acetic ether passes through conduit 7 to storage tank 8.

The hydrogen gas 10 from the gas tank goes to engine 12, is mixed with the air 11, becomes water vapor 13, which goes to the heat exchanger 3 where it vaporizes the incoming alcohol.

The system is operable when the engine is running. The catalyst used here is a special solid catalyst CuAlZnZr; with the following chemical reaction, the alcohol will become hydrogen and acetic ether:

$$2C_2H_5OH = CH_3COOC_2H_5 + 2H_2$$

There is no waste in this reaction.

The catalyst can be used continually for a half year without being refilled. The reaction can be done within 10 seconds. The reaction condition can be easily controlled and achieved at about 230° to 250° C. and 0.3 to 0.5 MPa pressure.

The main advantage of the system 5 is generating hydrogen in a self contained reactor which only needs a refilling of the catalyst periodically.

I claim:

1. A system for powering a vehicle, said system being mounted on the vehicle and comprising:

a first tank for storing alcohol;

a heat exchanger means communicating with said first tank for vaporizing alcohol from said first tank;

said heat exchanger means operably constructed to absorb heat from water vapor to vaporize said alcohol;

reactor means containing a catalyst for receiving said vaporized alcohol and converting said vaporized alcohol to hydrogen gas and acetic ether;

second tank means for receiving and storing said acetic ether;

third tank means for receiving and storing said hydrogen gas;

engine means for receiving said hydrogen gas from said third tank means and combusting said hydrogen with air to drive said vehicle and produce heated water vapor;

conduit means for supplying said heated water vapor to said heat exchanger providing that liquid alcohol entering said heat exchanger is vaporized by said heat exchanger.

2. The system of claim 1 wherein said catalyst is a CuAlZnZr compound.

3. The system of claim 2 wherein the chemical reaction that takes place in converting alcohol to hydrogen gas and acetic ether in the reactor takes place in a range of temperature of 230 to 250 centigrade and a range of pressure of 0.3 to 0.5 MPa.

* * * * *